(12) United States Patent
Thoroddsen et al.

(10) Patent No.: US 11,557,042 B2
(45) Date of Patent: Jan. 17, 2023

(54) SINGLE-CAMERA PARTICLE TRACKING SYSTEM AND METHOD

(71) Applicant: KING ABDULLAH UNIVERSITY OF SCIENCE AND TECHNOLOGY, Thuwal (SA)

(72) Inventors: Sigurdur Tryggvi Thoroddsen, Thuwal (SA); Andres A. Aguirre-Pablo, Thuwal (SA); Wolfgang Heidrich, Thuwal (SA); Jinhui Xiong, Thuwal (SA); Abdulrahman B. Aljedaani, Thuwal (SA); Ramzi Idoughi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/058,168

(22) PCT Filed: Apr. 9, 2019

(86) PCT No.: PCT/IB2019/052915
§ 371 (c)(1),
(2) Date: Nov. 24, 2020

(87) PCT Pub. No.: WO2019/239226
PCT Pub. Date: Dec. 19, 2019

(65) Prior Publication Data
US 2021/0166404 A1   Jun. 3, 2021

Related U.S. Application Data

(60) Provisional application No. 62/702,123, filed on Jul. 23, 2018, provisional application No. 62/683,879, filed on Jun. 12, 2018.

(51) Int. Cl.
*G06T 7/246* (2017.01)
*G06T 7/521* (2017.01)
(Continued)

(52) U.S. Cl.
CPC ............ *G06T 7/246* (2017.01); *G01S 7/4808* (2013.01); *G01S 17/42* (2013.01); *G01S 17/58* (2013.01);
(Continued)

(58) Field of Classification Search
None
See application file for complete search history.

(56) References Cited

U.S. PATENT DOCUMENTS 4,919,536 A * 4/1990 Komine .................. G01P 5/001
356/28
7,006,132 B2 2/2006 Pereira et al.
(Continued)

FOREIGN PATENT DOCUMENTS

AU       2003266932 A1 *  4/2004
CA          2719432 A1 *  4/1999  ........... C12Q 1/6816
(Continued)

OTHER PUBLICATIONS

Hassan et al., "A New Artificial Neural Network Tracking Technique for Particle Image Velocimetry," Experiments in Fluids, Springer, Heidelberg, Germany, vol. 23, No. 2, Jun. 1997, pp. 145-154 (Year: 1997).*
(Continued)

*Primary Examiner* — Reza Aghevli
(74) *Attorney, Agent, or Firm* — Patent Portfolio Builders PLLC

(57) ABSTRACT

A method for tracking moving particles in a fluid. The method includes illuminating the moving particles with an illumination sequence of patterns generated by a light pro-
(Continued)

jector; measuring with a single camera light intensities reflected by the moving particles; calculating, based on the measured light intensity, digital coordinates (x', y', z') of the moving particles; determining a mapping function f that maps the digital coordinates (x', y', z') of the moving particles to physical coordinates (x, y, z) of the moving particles; and calculating the physical coordinates (x, y, z) of the moving particles based on the mapping function f. The illumination sequence of patterns is generated with a single wavelength, and light emitted by the projector is perpendicular to light received by the single camera.

19 Claims, 10 Drawing Sheets

(51) Int. Cl.
G06T 7/73 (2017.01)
G01S 7/48 (2006.01)
G01S 17/42 (2006.01)
G01S 17/58 (2006.01)
H04N 5/20 (2006.01)
H04N 5/225 (2006.01)

(52) U.S. Cl.
CPC .............. G06T 7/521 (2017.01); G06T 7/73 (2017.01); H04N 5/2256 (2013.01)

(56) References Cited

U.S. PATENT DOCUMENTS

| 8,675,291 B2 | 3/2014 | Rohaly et al. | |
| 2018/0024063 A1* | 1/2018 | Egner | G02B 21/0032 359/386 |
| 2018/0045646 A1* | 2/2018 | Sheen | G01N 15/1468 |
| 2018/0259457 A1* | 9/2018 | Tanabe | G01N 21/6428 |
| 2018/0264289 A1* | 9/2018 | Michaud | A61N 5/1082 |
| 2019/0137381 A1* | 5/2019 | McConkey | G01N 15/1434 |
| 2019/0323938 A1* | 10/2019 | Bachalo | H01S 5/06804 |

FOREIGN PATENT DOCUMENTS

| CA | 2953335 C * | 1/2021 | G06K 9/00604 |
| EP | 0506657 B1 * | 10/1995 | G01P 5/001 |
| JP | 2004146703 A * | 5/2004 | G03F 7/20 |
| JP | 2004279244 A * | 10/2004 | G01N 21/956 |
| JP | 2014044095 A * | 3/2014 | G01B 11/00 |
| TW | 200303039 A * | 5/2003 | G03F 7/70591 |
| WO | WO-9110143 A1 * | 7/1991 | G01P 5/001 |
| WO | WO-2004042403 A2 * | 5/2004 | C12Q 1/6816 |
| WO | WO-2019002286 A1 * | 1/2019 | G01N 15/0227 |

OTHER PUBLICATIONS

Hassan, Y.A., et al., "A new artificial neural network tracking technique for particle image velocimetry," Experiments in Fluids, vol. 23, No. 2, Jun. 1, 1997, pp. 145-154, XP000738233.

Jaqaman, K., et al., "Robust single-particle tracking in live-cell time-lapse sequences," Nature Methods, vol. 5, No. 8, Aug. 2008 (Published online Jul. 20, 2008), pp. 695-702.

PCT International Search Report (Form PCT/ISA/210) for corresponding/related International Application No. PCT/IB2019/052915 dated Jul. 11, 2019.

PCT Written Opinion of the International Searching Authority (Form PCT/ISA/237) for corresponding/related International Application No. PCT/IB2019/052915 dated Jul. 11, 2019.

Tinevez, J.-Y., et al., "TrackMate: An open and extensible platform for single-particle tracking," Methods, vol. 115, 2017 (Available online Oct. 3, 2016), pp. 80-90.

Troutman, V.A., et al., "Single-camera three-dimensional tracking of natural particulate and zooplankton," Measurement Science and Technology, vol. 29, No. 7, May 17, 2018, 075401, pp. 1-18.

Aguirre-Pablo, A.A., et al., "Tomographic Particle Image Velocimetry using Smartphones and Colored Shadows," Scientific Reports, Jun. 16, 2017, Vo. 7, No. 3714, pp. 1-18.

Casey, T.A., et al., "Scanning Tomographic Particle Image Velocimetry Applied to a Turbulent Jet," Physics of Fluids, Feb. 21, 2013, vol. 25, pp. 025102-1-025102-31, American Institute of Physics.

Cenedese, A., et al., "3D Particle Reconstruction Using Light Field Imaging," 16th International Symposium on Applicants of Laser Techniques to Fluid Mechanics, Lisbon, Portugal, Jul. 9-12, 2012, pp. 1-9.

Cierpka, C., et al., "A Simple Single Camera 3C3D Velocity Measurement Technique Without Errors Due to Depth of Correlation and Spatial Averaging for Microfluidics," Measurement Science and Technology, Mar. 3, 2010, vol. 21, 045401, pp. 1-13), IOP Publishing.

Dennis, K., et al., "A Multicolor Grid Technique for Volumetric Velocity Measurements," Proceedings of the ASME 2017 Fluids Engineering Division Summer Meeting, FEDSM2017, Jul. 30-Aug. 3, 2017, Waikoloa, Hawaii, pp. 1-9.

Elsinga, G.E., et al., "Tomographic Particle Image Velocimetry," Experiments in Fluids, Oct. 11, 2006, vol. 41, pp. 933-947, Springer.

Gao, Q., et al., "A Single Camera Volumetric Particle Image Velocimetry and its Application," Science China, Sep. 2012, vol. 55, No. 9, pp. 2501-2510, Science China Press and Springer-Verlag Berlin Heidelberg.

Hain, R., et al., "3D3C Time-Resolved Measurements with a Single Camera Using Optical Aberrations," 13th International Symposium on Applications of Laser Techniques to Fluid Mechanics, Lisbon Portugal, Jun. 26-29, 2006, pp. 1-9.

Hassan, Y.A., et al., "A New Artificial Neural Network Tracking Technique for Particle Image Velocimetry," Experiments in Fluids, Jun. 1997, vol. 23, pp. 145-154, Springer-Verlag.

Hoyer, K., et al., "3D Scanning Particle Tracking Velocimetry," Experiments in Fluids, Aug. 25, 2005, vol. 39, pp. 923-934.

Ido, T., et al., "Single-Camera e-D Particle Tracking Velocimetry Using Liquid Crystal Image Projector," Proceedings of the ASME-JSME FED-SM 2003: 4th ASME_JSME Joint Fluids Engineering Conference, Jul. 6-10, 2003, Honolulu, Hawaii, pp. 1-8.

Kreizer, M., et al., "Three-Dimensional Particle Tracking Method using FPGA-Based Real-Time Image Processing and Four-View Image Splitter," Experiments in Fluids, Aug. 26, 2010, vol. 50, pp. 613-620, Springer.

Maekawa, A., et al., "Development of Multiple-Eye PIV using Mirror Array," Measure Science and Technology, May 15, 2018, vol. 29, 064011, pp. 1-11, IOP Publishing.

McGregor, T.J., et al., "Laser-Based Volumetric Colour-Coded Three-Dimensional Particle Velocimetry," Optics and Lasers in Engineering, Apr. 16, 2007, vol. 45, pp. 882-889, Elsevier Ltd.

Murai, Y., et al., "Color Particle Image Velocimetry Improved by Decomposition of RGB Distribution Integrated in Depth Direction," Proceedings of the ASME-JSME-KSME 2015 Joint Fluids Engineering Conference, AJKFluids2015, Jul. 26-31, 2015, Seoul, Korea, pp. 1-6.

Peterson, K., et al., "Single-Camera, Three-Dimensional Particle Tracking Velocimetry," Optics Express, Apr. 3, 2012, vol. 20, No. 8, pp. 1-7.

Rice, B.E., et al., "Comparison of 4-Camera Tomographic PIV and Single-Camera Plenoptic PIV," 2018 AIAA Aerospace Sciences Meeting, AIAA Science and Technology Forum and Exposition 2018, Jan. 8-12, 2018, Kissimmee, Florida, pp. 1-11, American Institute of Aeronautics and Astronautics Paper.

Ruck, B., "Colour-Coded Tomography in Fluid Mechanics," Optics & Laser Technology, Jun. 28, 2009, vol. 43, pp. 375-380, Elsevier Ltd.

Schanz, D., et al., "Shake-The-Box: Lagrangian Particle Tracking at High Particle Image Densities," Experiments in Fluids, Apr. 27, 2016, vol. 57, No. 70, pp. 1-27, Springer.

Schott, Data Sheet, Schott N-BK7, 517642.251, downloaded from the internet Oct. 9, 2018.

(56) References Cited

OTHER PUBLICATIONS

Shi, S., et al., A Detailed Comparison of Single-Camera Light-Field PIV and Tomographic PIV, Experiments in Fluids, Feb. 10, 2018, vol. 59, No. 46, pp. 1-13, Springer.
Skupsch, C., et al., "Multiple-Plane Particle Image Velocimetry Using a Light-Field Camera," Optics Express, Jan. 16, 2013, vol. 21, No. 2, pp. 1-15.
Toprak, E., et al., "Three-Dimensional Particle Tracking via Bifocal Imaging," Nano Letters, Jun. 21, 2007, vol. 7, No. 7, pp. 2043-2045.
Watamura, T., et al., "LCD-Projector-Based 3D Color PTV," Experimental Thermal and Fluid Science, Jan. 17, 2013, vol. 47, pp. 68-80, Elsevier Inc.
Westerweel, J., et al., "Particle Image Velocimetry for Complex and Turbulent Flows," Annual Review of Fluid Mechanics, Oct. 8, 2012, vol. 45, pp. 409-436.
Willert, C.E., et al., "Three-Dimensional Particle Imaging with a Single Camera," Experiments in Fluids, Apr. 1992, No. 12, pp. 353-358, Springer-Verlag.
Wu, M. et al., "Three-Dimensional Fluorescent Particle Tracking at Micron-Scale using a Single Camera," Experiments in Fluids, Feb. 26, 2005, vol. 38, pp. 461-465.
Xiong, J., et al., "Rainbow Particle Imaging Velocimetry for Dense 3D Fluid Velocity Imaging," ACM Transactions on Graphics, Jul. 2017, vol. 36, No. 4, Article 36, pp. 1-14.

* cited by examiner

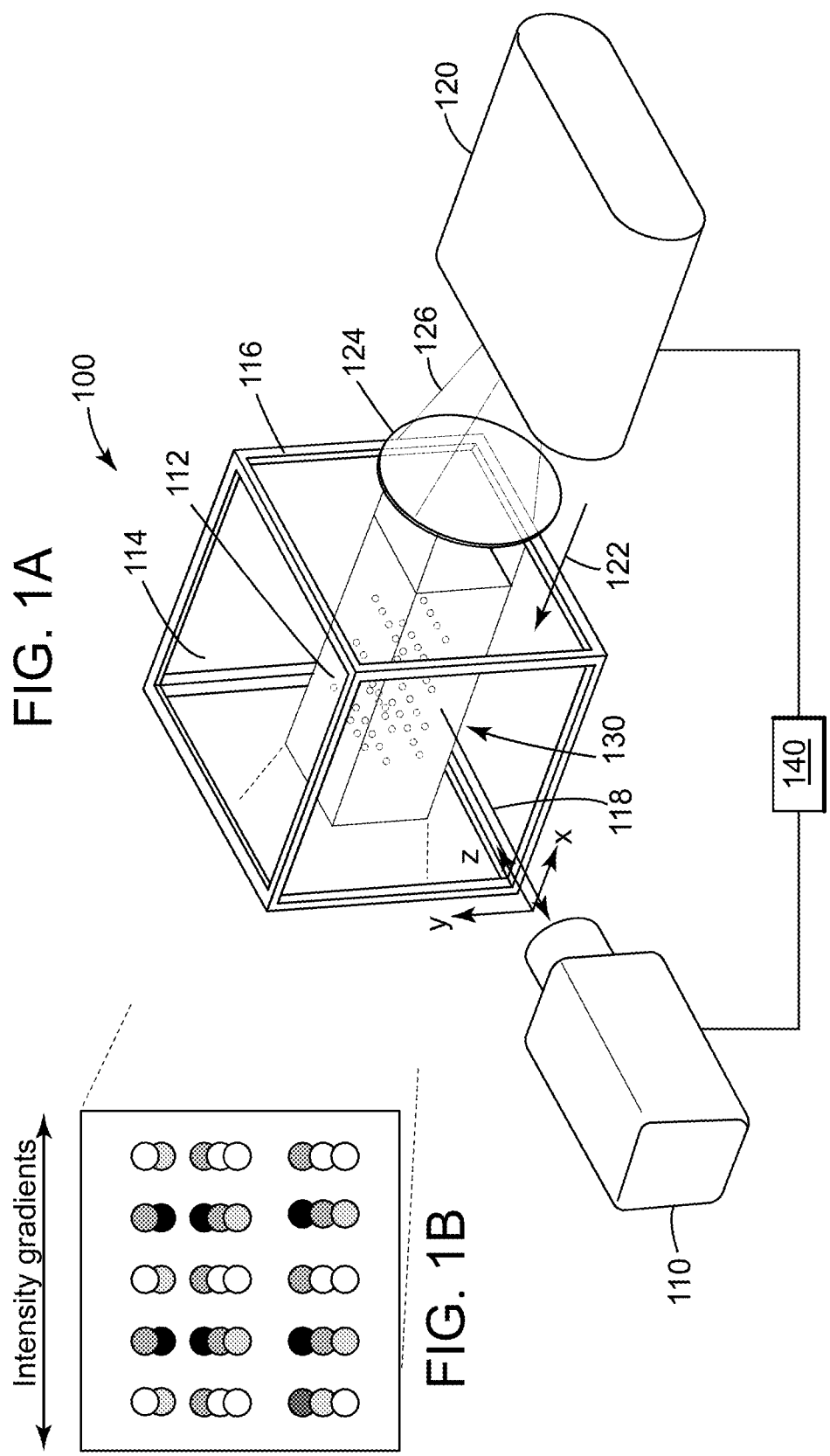

FIG. 7

| Table 1 | $z(x',z')$ | $x(x',y',z)$ | $y(x',y',z)$ |
|---|---|---|---|
| $a_0$ | -10.0869 | -29.9733 | -28.4576 |
| $a_1$ | 0.0025 | 0.0470 | 8.22E-06 |
| $a_2$ | 0.3191 | 0.0001 | 0.0474 |
| $a_3$ | 5.61E-07 | -0.0570 | -0.0570 |
| $a_4$ | -3.58E-05 | 1.75E-07 | -5.96E-08 |
| $a_5$ | -3.40E-05 | 8.90E-09 | -1.32E-07 |
| $a_6$ | --- | 2.10E-05 | -3.13E-05 |
| $a_7$ | --- | 3.78E-08 | -1.21E-10 |
| $a_8$ | --- | 9.02E-05 | 4.09E-07 |
| $a_9$ | --- | 2.62E-07 | 9.09E-05 |
| $RMS_e$ (mm) | 0.2714 | 0.0263 | 0.0181 |
| $R^2$ | 0.9998 | 0.9999 | 0.9999 |

SINGLE-CAMERA PARTICLE TRACKING SYSTEM AND METHOD

CROSS-REFERENCE TO RELATED APPLICATIONS

This application is a U.S. National Stage Application of International Application No. PCT/IB2019/052915, filed on Apr. 9, 2019, which claims priority to U.S. Provisional Patent Application No. 62/683,879, filed on Jun. 12, 2018, entitled "3-D PARTICLE TRACKING VELOCIMETRY WITH A SINGLE CAMERA USING STRUCTURED LIGHT AND PARTICLE INTENSITIES," and U.S. Provisional Patent Application No. 62/702,123, filed on Jul. 23, 2018, entitled "SINGLE-CAMERA PARTICLE TRACKING SYSTEM AND METHOD," the disclosures of which are incorporated herein by reference in their entirety.

BACKGROUND

Technical Field

Embodiments of the subject matter disclosed herein generally relate to a system and method for tracking plural moving particles with a single camera in a 3D space, and more specifically, using structured monochromatic volume illumination with spatially varying intensity profiles to track the plural moving particles.

Discussion of the Background

Particle tracking velocimetry (PTV) is a technique to measure velocity of particles that are resident in a fluid. This technique comes in two flavors: the two-dimensional (2D) PTV, in which the flow field is measured in a two-dimensional slice of the flow, and the three-dimensional particle tracking velocimetry (3D-PTV), which is based on a multiple camera-system, three-dimensional volume illumination and tracking of flow tracers (i.e., particles) in the three-dimensional space. The 3D-PTV algorithm is very computer intensive.

The PTV technique is becoming the standard technique in 3-D velocimetry. The recent addition of shake-the-box algorithm speeds up the calculations and changes the basic nature of this process from a correlation technique used in Particle Image Velocimetry (PIV) to high-resolution particle tracking. This speeds up the calculations. However, this technique uses particle tracers over numerous time-steps, thus requiring multiple high-speed cameras to be implemented.

Efforts to reduce the complexity of this kind of systems have been previously carried out. One research group produced instantaneous Tomographic PIV measurements of a vortex ring without the need of using specialized equipment by recording the movement of the particles with multiple smartphone cameras and using high power LED's in a back-lit configuration. This reduced dramatically the cost of hardware for this kind of 3D-3C measurements. Despite these efforts, the need of multiple cameras makes such systems complicated.

Attempts to produce 3D-3C (3-dimension, 3-components) velocity fields with a single camera have been previously tried using a 3 pin hole aperture, image splitters to produce multiple views on a single sensor, defocused PTV, optical aberrations, scanning, plenoptic (light-field) cameras or colored coded illumination. However, such techniques reduce the effective camera sensor's resolution, have relatively low depth resolution (20 levels or less), or low temporal resolution. As well, the reconstructed volume is usually limited to 10 mm or less in depth.

Therefore, there is a need for a new method and system that are not limited by the above drawbacks, use a simpler camera setup, and are not computationally intensive.

SUMMARY

According to an embodiment, there is a method for tracking moving particles in a fluid. The method includes illuminating the moving particles with an illumination sequence of patterns generated by a light projector, measuring with a single camera light intensities reflected by the moving particles, calculating, based on the measured light intensity, digital coordinates (x', y', z') of the moving particles, determining a mapping function f that maps the digital coordinates (x', y', z') of the moving particles to physical coordinates (x, y, z) of the moving particles, and calculating the physical coordinates (x, y, z) of the moving particles based on the mapping function f. The illumination sequence of patterns is generated with a single wavelength, and light emitted by the projector is perpendicular to light received by the single camera.

According to another embodiment, there is a particle tracking velocimetry (PTV) system that includes a transparent tank configured to hold plural particles that move in a fluid, a light projector that is configured to generate a monochromatic light and illuminate with the monochromatic light the plural particles while moving, a single camera configured to record light intensities associated with light reflected on the moving plural particles, and a controller connected to the light projector and to the single camera and configured to calculate paths of the moving particles based on the light intensities recorded by the single camera. The monochromatic light projected by the projector is perpendicular on the light recorded by the single camera.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1A is a schematic illustration of a PTV system having a single camera and FIG. 1B illustrates a light intensity projected on particles;

FIG. 7 illustrates various coefficients for a mapping function;

DETAILED DESCRIPTION

Figure 2B:
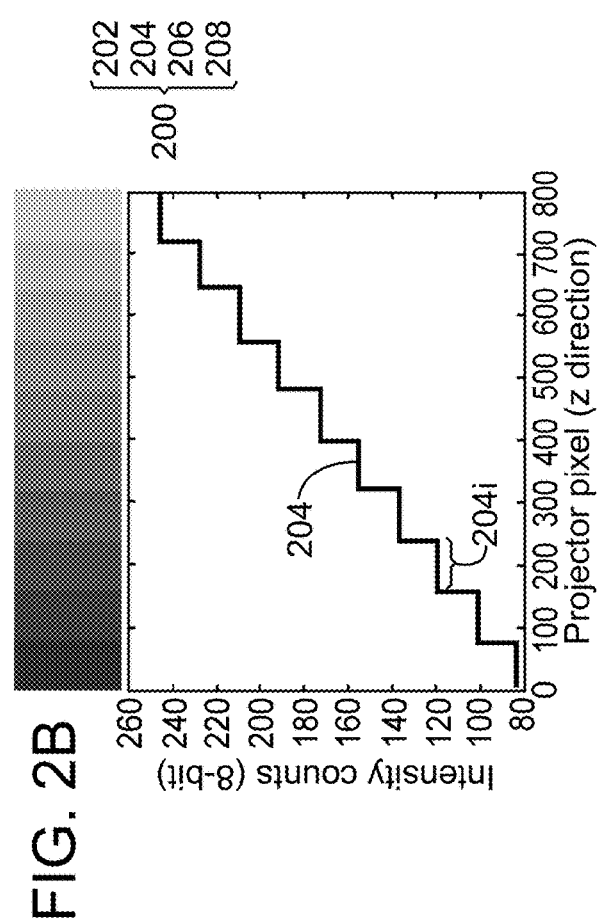
FIGS. 2A to 2D illustrate various light intensity patterns projected by a light projector onto moving particles.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to plural particles that are moving in a fluid that is kept in a rectangular container. However, the invention is not limited to one fluid or a rectangular container.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel system and method for tracking particles' velocity is proposed. In the proposed system, structured monochromatic volume illumination with spatially varying intensity profiles is used to achieve 3D-PTV using a single video camera. The video camera records the 2-D motion of a 3-D particle field within a fluid, which is perpendicularly illuminated with depth gradients of the illumination intensity. This allows the method to encode the depth position perpendicular to the camera, in the intensity of the light reflected by each particle image. The light-intensity field is calibrated using a 3D laser-engraved glass cube containing a known distribution of defects. This is used to correct the distortions and the divergence of the projected light. An illumination sequence of changing light patterns with numerous sub-gradients in the intensity is used to achieve plural depth-levels (e.g., 200). Those skilled in the art would understand that the number of depth-levels can be increased, depending on the capabilities of the camera and projected light that is employed for the detection.

In one embodiment, the proposed system uses one single (video) camera to track in time numerous particles in a fully 3-D volume of 50×50×50 mm$^3$, producing 200 levels of depth resolution. Distortions and light divergence are corrected by using the 3D laser engraved cube as now discussed.

In this embodiment, as illustrated in FIG. 1A, the PTV system 100 includes one monochromatic camera 110, which tracks in time plural particles 112 suspended in a fluid 114 contained in a tank 116. In this case, the tank 116 is a 3-D volume of 120×120×250 mm$^3$. The tank in this application is a transparent acrylic tank. Although the tank in this application includes a liquid in which the particles are dispersed, the tank may be used with a gas in which the particles are dispersed. A projector (e.g., LCD projector, but any other projector may be used) 120 is configured to illuminate the particles 112 floating in the fluid 114, along an illumination direction 122, as shown in the figure. A controller 140 is connected to both the camera 110 and the projector 120 and coordinates the actions of these two elements. For example, the controller 140 controls the projector about what patterns to project and also controls the camera with regard to when to record the intensity of the light reflected from the particles. Note that the illumination direction 122 is along the X axis, but having an opposite direction in this embodiment. Camera 110 (which may be a video camera having a 5.5 Mpx S-CMOS resolution with high quantum efficiency and capable of recording images of 16-bits, or any other type of camera) is configured to receive light reflections 118 from the particles 112, along a Z direction, as shown in FIG. 1B. The fluid 114 is selected for this embodiment to be a BK7 glass refractive index matched liquid. A mixture of silicone based heat transfer fluids 510 and 710 is used as the working fluid 114. Those skilled in the art would understand that the principles of the invention are applicable to other fluids and/or particles.

FIG. 1A also shows a collimating lens 124 that is used to focus the monochromatic light 126 emitted by the projector 120 into a desired region of the tank 116. Various intensity gradients of the monochromatic light 126 generated by the projector 120 are projected (as discussed later), for illuminating the particles 112 in the fluid 114. FIG. 1B schematically shows the intensity gradients for a number of particles. Note that the light 126 emitted by the projector 120 is substantially (i.e., within 1 to 10 degrees) perpendicular to the reflected light 118 received by the camera 110. The light 126 generated by the projector is monochrome, i.e., includes a single wavelength. For this embodiment, the light is selected to be green to minimize possible chromatic aberrations from the particle diffraction or the container's acrylic walls. However, those skilled in the art would understand that other wavelengths may be used or even a combination of wavelengths.

One advantage of using a projector 120 for the illumination of the particles 112, is the flexibility of the structured light, making it simple to modify and adjust the illuminated volume size, as well as controlling the projected framerate and patterns. There is a trade-off between the size of the illuminated volume vs. the brightness recorded from the particles. In this embodiment, the illuminated volume 130 is approximately 50×50×50 mm$^3$.

Figure 2D:
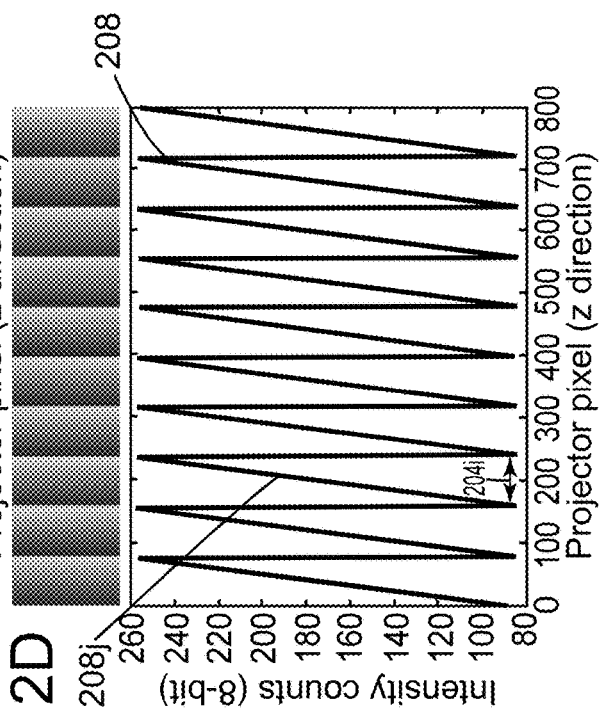
Figure 2A:
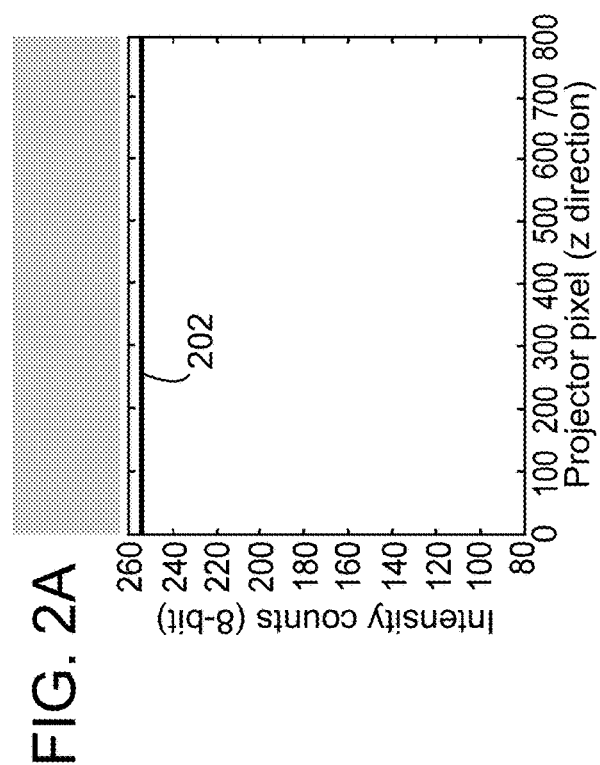

Particles 112 are illuminated with various light patterns (which form an "illumination sequence") as now discussed with regard to FIGS. 2A to 2D. The illumination sequence 200 changes the illumination of the particles to refine the location of the particles in subsequent video images. For example, a single illumination sequence 200 starts with a uniform lighting 202 of the particles to extract the intrinsic brightness of each particle. In one application, the uniform lighting 202 is selected to have a constant intensity over a plurality of pixels, as illustrated in FIG. 2A. In this regard, note that the abscissa of FIG. 2A shows the number of pixels that are considered, i.e., from 0 to 800. A projector is capable of projecting light over a larger pixel range, for example, from zero to 1920. The choice for this embodiment is to select the pixel range from zero to 800. However, one skill in the art would understand that other ranges are possible. The ordinate in FIG. 2A shows the intensity counts, i.e., the digital intensity counted by the processor of the projector for each pixel on the abscissa. If an 8-bit scale is selected, then the different intensities that can be recorded by a processor are $2^8$, i.e., about 256 different intensities. Because the setup shown in FIG. 1 needs a minimum amount of light in order to differentiate the various intensity gradients, in this embodiment only intensity counts from 80 to 256 are selected. However, one skilled in the art would understand that other ranges may be selected for the intensity count. The uniform lighting pattern 202 is projected in a single frame and is used to calibrate the intrinsic brightness of each particle once every illumination cycle. A "frame" in this context means an image that appears on a display.

Next, the projector 120 is programmed to generate a step-like structured lighting, or a linear discrete gradient over the entire depth of the selected volume 130, to get an approximate depth-location of the particles. In this embodiment, the volume 130 is split into 10 equal sectors and for this reason this pattern is also called an $L_{10}$ pattern. An example of a $L_{10}$ pattern 204 is shown in FIG. 2B. Note that each sector of the volume 130 has a corresponding constant discrete illumination 204i. The $L_{10}$ pattern is projected in the volume in a single frame. As a result of applying the $L_{10}$ pattern, and after processing the data collected by the camera (as discussed later), it would be possible to estimate the location of a particle within one of the 10 sectors. However, it would not be possible to provide a more accurate location of the particle within the sector without a further pattern.

Figure 2C:
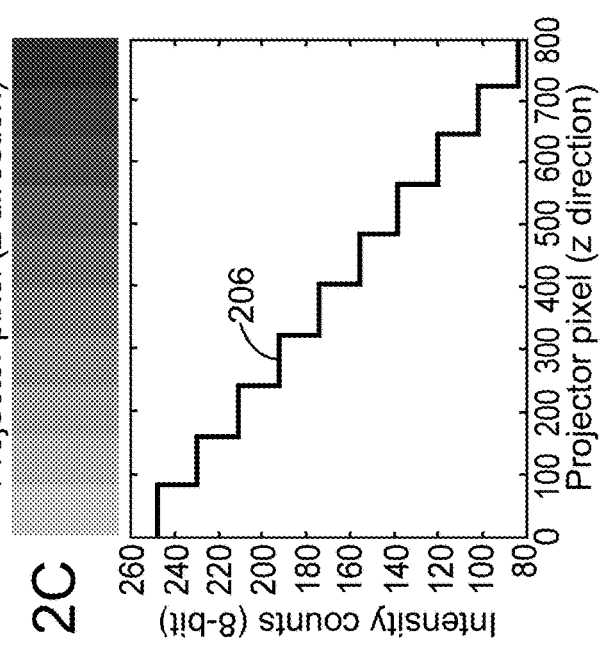

For improved accuracy, the following frame projected by the projector on the particles is a mirrored image of the previous one, to minimize any error. For example, as shown in FIG. 2C, the next projected pattern 206 is just the reverse of pattern 204. In one application, projecting pattern 206 is optional.

The next pattern in the sequence 200, which is also the last one in this embodiment, is a multiple intensity gradients pattern 208, as illustrated in FIG. 2D. This pattern is used to refine the locations of the particles inside each sector $L_{10}$. This pattern is called $L_{20}$, because it has 20 levels 208j of the intensity gradient for each sector 204i. In this case, "i" varies from 1 to 10 while "j" varies from 1 to 20. The pattern 208 is projected for 5 consecutive frames. Thus, the projected illumination sequence 200 allows to obtain 200 digital depth levels of resolution in the z direction, which are not visible by the camera 110. The total length of the projected illumination sequence 200 is 8 frames for this embodiment. This illumination cycle (i.e., 8 frames of varying intensity gradient patterns 202, 204, 206, and 208) is repeated in a loop and allows the method to track the moving particles over time. An illumination cycle may have more or less than 8 frames.

In this embodiment, particles 112 were made of white polyethylene (Cospheric particles) of size 125-150 µm. This material allows the particles to scatter enough light in order to be detected by the camera's sensor, minimizing the contamination of the signal intensity from neighboring particles. One skilled in the art would understand that other types and sizes of particles may be used.

Thus, after repeating the above noted patterns in a loop, the intensity of each particle in the tank is measured by the camera. Based on these intensities, as discussed later, the digital depth z' of each particle can be calculated (to be discussed next). Herein, the digital depth is considered the intensity count measured by the sensor of the camera for each particle, where the intensity count characterizes only light scattered by the particle (the source of the light is the projector shown in FIG. 1). In other words, by measuring with the processor of the camera 110 the intensity of the light corresponding to each particle, a digital depth z' can be determined for each particle, where the digital depth z' is related to the measured light intensity of each particle. For this reason, the depth z' is called a digital depth, i.e., it is not an actual depth in meters of each particle. However, it is now necessary to map the digital depth z' into the actual depth z (in meters) for each particle. Note that the x and y coordinates (in meters) of each particle can be established from the images recorded by the camera 110. In other words, each image recorded by the camera 110 shows the x' and y' coordinates (which are digital coordinates in pixels) of each particle and the digital depth z' of each particle (an arbitrary unit).

Next it is discussed how the digital depth z' of each particle is calculated with the configuration shown in FIG. 1. A first step for achieving this is to calibrate the light intensity of the selected volume 130 and associated particles 112. The light intensity calibration technique relies on the intensity of the light scattered by the particles. Thus, it is desired to minimize any noise or fluctuation in the sensed light intensity due to the size dispersion, surface roughness or imperfections of the particles. Also, it is expected that particles closer to the camera and the projector will show a higher intensity. Therefore, it is necessary to calibrate the intrinsic light intensity of each particle. For this, a master light curve is produced from statistics of thousands of particles in the field of view of the camera, with no motion applied to the fluid. In other words, the calibration process uses known positions of particles in a given volume and their recorded intensities are linked to their known positions. A uniform intensity 8-bit image is projected with the projector 120 at a given time, illuminating all the static particles that are used for this calibration process. The response signal is recorded with the camera 110. This step is repeated for 20 different intensity levels, starting from 84 counts to the maximum of 255 counts (because of the 8-bit monochromatic image).

The digital 2-D coordinates in pixels (x', y') of the particles are obtained using an open source software for Particle Tracking (see, for example, Jean-Yves Tinevez, Nick Perry, Johannes Schindelin, Genevieve M Hoopes, Gregory D Reynolds, Emmanuel Laplantine, Sebastian Y Bednarek, Spencer L Shorte, and Kevin W Eliceiri, "Trackmate: An open and extensible platform for single-particle tracking," Methods, 115:80-90, 2017). The original intended use for Trackmate was for cell detection and tracking, among other biomedical and biological applications. However, the flexibility and robustness of this program makes it a very good choice for particle tracking in a flow field. This detection algorithm is based on Laplace of Gaussian segmentation. The particle-linking algorithm is based on the Linear Assignment Problem created by Jaqaman, et al. (see, Khuloud Jaqaman, Dinah Loerke, Marcel Mettlen, Hirotaka Kuwata, Sergio Grinstein, Sandra L Schmid, and Gaudenz Danuser, "Robust single-particle tracking in live-cell time-lapse sequences," Nature methods, 5(8):695, 2008). This way, features of every single particle can be measured, such as the weighted integral intensity $I_w$ and/or the maximum intensity pixel $I_{max}$ for each particle for every intensity level. The response signal recorded by the sensor of the camera for each particle at all levels is then normalized by the value obtained when the image of 255 counts is projected. The mean response signal $I_{mean}$ and a second degree polynomial fit 300 are presented in FIG. 3, as well as their standard deviation dispersion. This curve 300 will allow the method to determine the depth level z' of the particle using an algorithm described later.

To test the potential of this technique, first the slowly moving field of a few particles is illuminated with a uniform volume illumination. This is used to quantify how constant the scattered light from the individual particles remains as their images are shifted over pixel boundaries on the CMOS sensor of the camera 110. The results of this test show how the distribution of intensities spreads among the pixels, making them vary strongly from frame to frame. For a randomly selected particle, the peak 8-bit pixel intensities take the following values: 176, 188, 170, 183, 187, 175, 187, 186, and 190, thus varying over a range of ≃11%. The effective particle intensity needs to be estimated from a weighted integral over the particle area, thereby incorporating both its intensity C and width σ.

In one application, the intensity-profile of each particle is fit with a 2-D Gaussian shape given by:

$$I(x,y) = C \exp[-(x^2+y^2)/\sigma^2]. \quad (1)$$

This profile is fit by shifting the sub-pixel peak location ($x_o$, $y_o$) and adjusting the magnitude C and width σ. The least-square best fit only uses pixels where the intensity exceeds a certain threshold. As expected, the peak intensity and the width are anti-correlated. However, it is found that the best intensity estimate is given by combining the central intensity and the image width as follows:

$$I_0 = C\sigma^{3/2}. \quad (2)$$

Repeated tests show that the variation of $I_o$ is within bounds of ±2%. Theoretically, with 10 sub-gradients of the illumination intensity, the method should be able to distinguish 250 depth levels for the particles. Thus, the intensity light technique is adequate for determining the depth level z' for each particle in the tank 116.

Figure 4B:
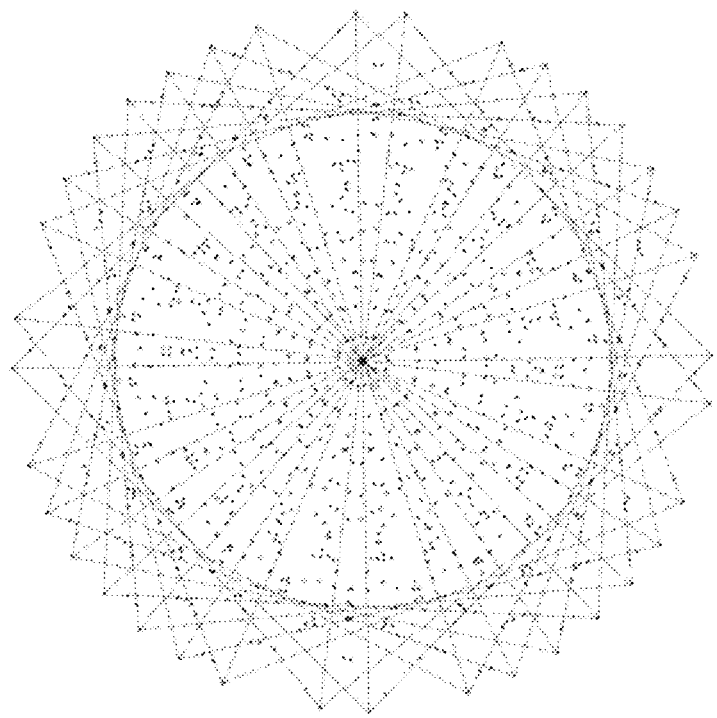
FIGS. 4A and 4B illustrate a cube having known marks that is used for 3D position calibration.
Figure 4A:
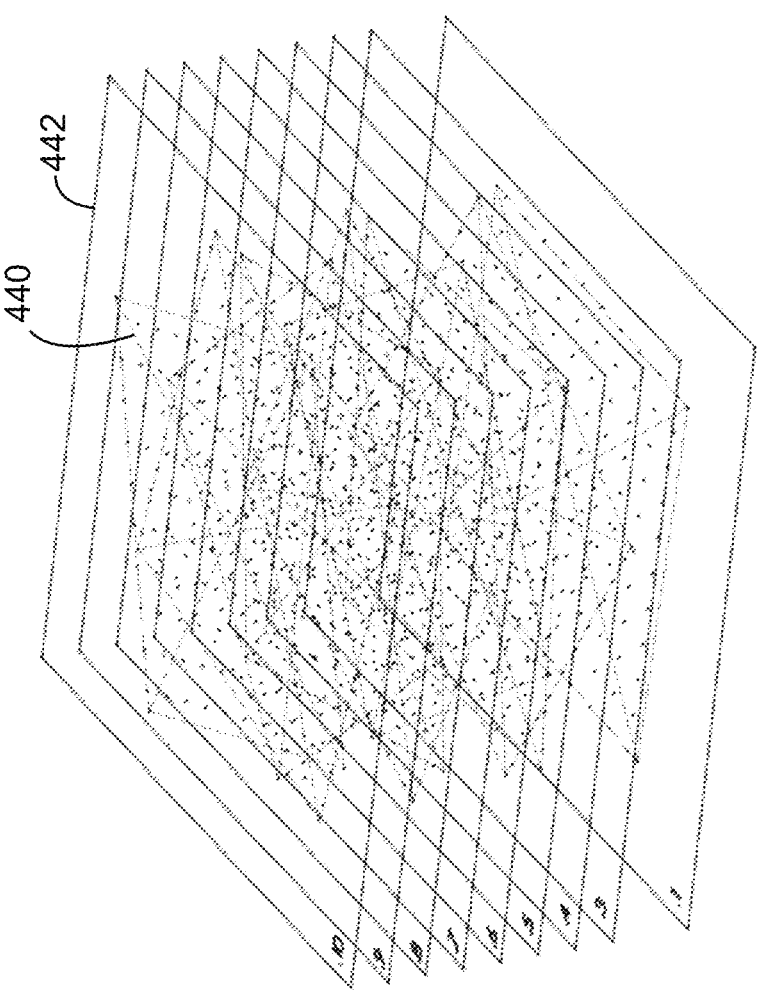

Next, the digital depth level z' needs to be mapped to the actual depth z for each tracked particle. This step is achieved by using a 3D position calibration cube 400 (see FIG. 4A), which also corrects the projector's light divergence and perspective distortion. To calibrate the real space coordinates (x, y, z) of each particle from the projected frames and correct for lens distortions, in this step a 3D laser engraved calibration cube of 80×80×80 mm³ is used. The 3D laser engraving process in glass is a well-known industrial process. It consists of a high power laser that produces micro cracks in a structured way inside the glass where the focal point of the laser is placed. The material of the cube used herein is BK7 optical glass, which has a refractive index of 1.519 at 20° C. and a wavelength of 527 nm. Using this material, a 3D array of micro-cracks 440 is formed in 10 different planes 442, containing 110 micro-cracks each, as shown in FIG. 4A. Each plane 442 is rotated with respect to the previous one by 32.7 degrees, to ensure that no other crack will block the illumination from the projector, nor block it from the camera. This will allow the method to simulate a static particle field of 1100 particles as illustrated in FIG. 4B.

A light intensity calibration (described with regard to FIG. 3) is applied using the same 20 intensity levels to obtain the digital depth position z' using the algorithm described later. The digital coordinates (x', y') with subpixel accuracy of the cracks 442 in the cube 400 are obtained using the Trackmate open source software. Subsequently, the video sequence with multiple frames and gradients (see FIGS. 2A to 2D) is projected onto the cube 400 the same way as it is done for the real particles 112 in the volume 130.

Figure 5:
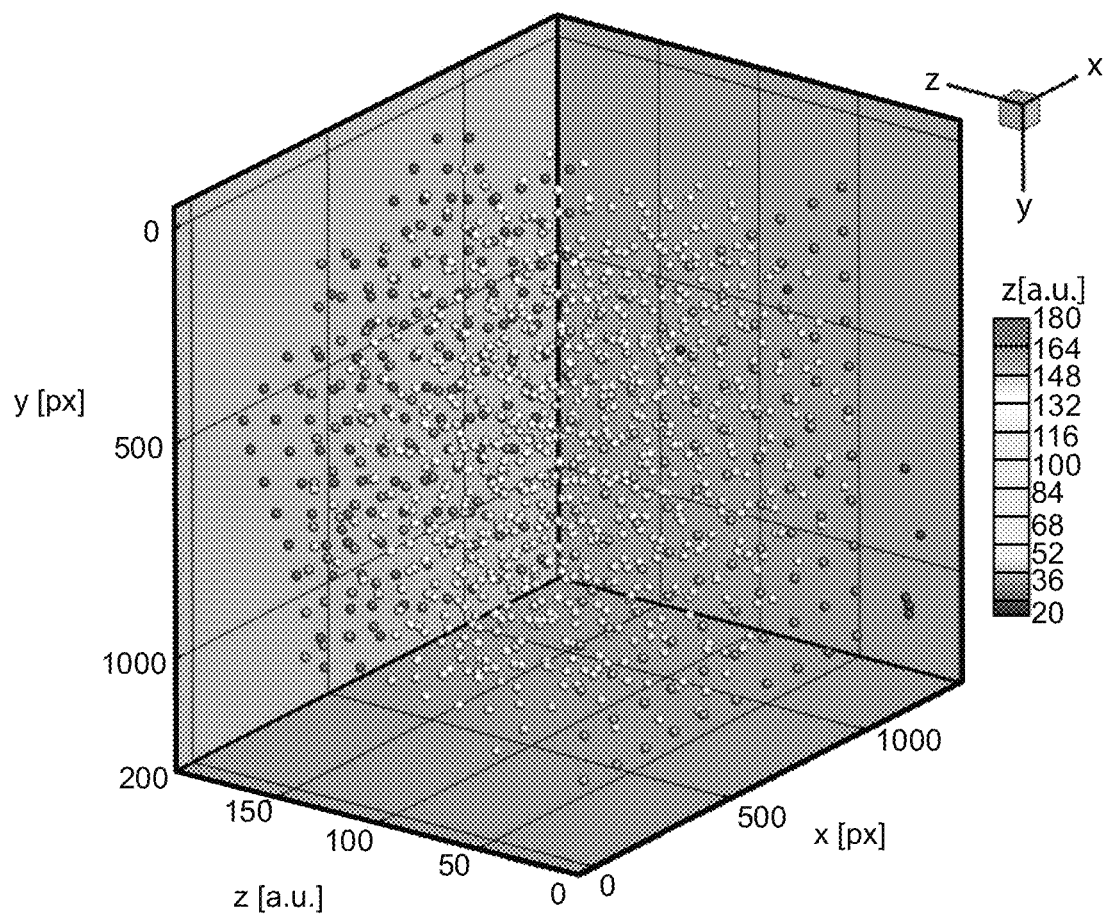
FIG. 5 illustrates reconstructed particles from the known marks used for the 3D calibration.

Both calibrations (light intensity and spatial calibration) allow the method to reconstruct the 3D pattern of the cube 400 including cracks 440 (i.e., simulated particles) as shown in FIG. 5. Subsequently, a 3-D mapping function is obtained to correct distortions and connect the digital space coordinates (x', y', z') of the measured particles to the real space coordinates (x, y, z) of the actual particles, as discussed later. Note that the locations of the microcracks 460 inside the cube 400 are well known (as the cube is designed as desired), which makes possible the mapping of the actual microcracks 460 to the estimated microcracks using the light intensity method previously discussed.

An algorithm for determining the digital space depth z' for every particle is now discussed. To obtain the digital space depth position z' for every particle 112, it is necessary to analyze their recorded intensity I (recorded with the sensor of the camera 110) in space and time. For the setup illustrated in FIG. 1, the particle size is approximately 6 pixels in diameter. Therefore, it is possible to select one of three different parameters for each particle to calculate the digital depth position z'. The three different parameters are: the maximum pixel intensity ($I_{max}$), weighted average intensity ($I_w$), or the effective particle intensity ($I_o$), which was defined in equation (2). One skilled in the art would understand that a parameter related to one of these three parameters or a combination of these parameters may also be used for these calculations. In one application, one or more of these parameters are normalized with the maximum value of each illumination cycle. This allows the method to quantify the intrinsic intensity for every single particle during multiple illumination cycles and assign a corresponding depth position. A plot comparing the statistical dispersion as a mean absolute deviation (MAD) in a light intensity calibration of these three parameters indicates that $I_{max}$ and $I_0$ present the lower dispersion values. The MAD is defined as:

$$MAD = \frac{1}{N}\sum_{i=1}^{N}|I_i - \bar{I}|,$$

where N is the number of sampled particles, I is the parameter being studied (e.g., $I_{max}$, $I_w$, or $I_o$), and $\bar{I}$ is the mean of that parameter.

This measure of variability is used since it is more robust in identifying the parameter that produces the smallest error deviation, thereby being more resilient to outlier data points and assigning more weight to the data points closer to the fit. Based on the results of this comparison, the present embodiment uses the $I_o$ as the parameter for calculating the digital depth position z' because this parameter presents the lowest dispersion values. Thus, a master light curve using $I_o$ is next used.

Figure 3:
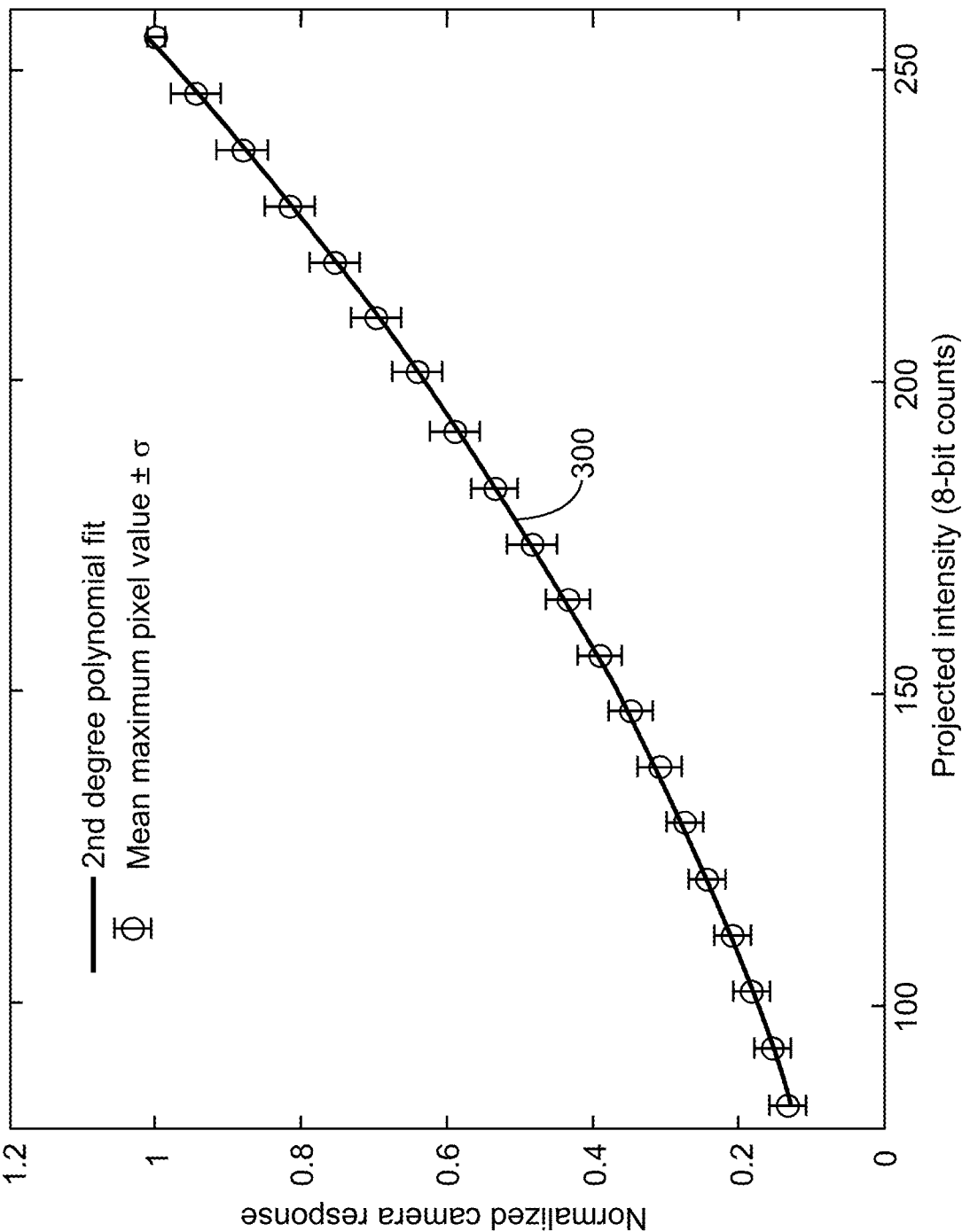
FIG. 3 illustrates a master light curve that links a digital depth position z' of a particle with a light intensity measured by the single camera.

Sectors for every projected frame are created based on the theoretical response of the camera obtained by the light calibration curve 300 shown in FIG. 3. The first video frame is a solid one-color only pattern (see pattern 202 in FIG. 2A) that is used to calibrate the intrinsic intensity of the particle 112. Because of this, the first video frame does not require a sector. For the second video frame, the pattern 204 of FIG. 2B is applied. Because the pattern 204 has 10 intensity levels, 10 equally distributed sectors are created with their midpoints ($I_{mid}$) located between 84-255 counts (see Y axis of FIG. 2B) in steps (δs) of 18 counts, and normalized by the maximum intensity of an 8-bit image (255 counts). The upper and lower limits of each sector are defined by $L_{im} = I_{mid} \pm \delta s$. The third projected frame employs the pattern 206, which is shown in FIG. 2C, is a mirrored version of frame 2. Frames 4-8, which project the pattern 208, each includes 20 bins (84-255 counts) with δs=9 counts, as 20 intensity levels 208j are used. Thus, each particle 112 would be localized in one of 10 sectors due to measurements from $L_{10}$, and then further be localized in one of 20 bins due to measurement from $L_{20}$.

Based on the measured maximum intensity $I_o$, every particle 112 is then allocated in the corresponding depth sector and bin ($L_{10}$ for video frames 2 and 3 and $L_{20}$ for video frames 4-8) at every recorded video frame. This is achieved by comparing the master light curve 300 (see FIG. 3) with the detected $I_o$. It is noteworthy to mention that LCD projectors have a transition time between projected frames. Therefore, due to the unsynchronized camera-projector system, one can notice a periodical single transition frame recorded with the camera for every projected frame. This frame (e.g., frame 1 in this example) is neglected for the depth estimation method. However, 2D information of the particles in those frames is valuable and may be used for x', y' tracking purposes.

One advantage of oversampling the projected video frames (4 frames in the camera-recorded video represent 1 projected frame because the projector in FIG. 1 projects a frame with a frequency of 15 frames per second while the camera records a frame with a frequency of 60 frames per second) is that the method can use temporal statistics for correcting spurious depth estimations in the $L_{10}$ sectors. In this regard, to fully define the digital depth position z' at any time, it is necessary to define $L_{10}$ and $L_{20}$ for every particle at every time. Therefore, if the statistical mode of $L_{10}$ from the projected frames 2 and 3 is $Mo(L_{10}) \geq 4$, then $L_{10}$ is defined during that illumination cycle. Additionally, if max $(L_{20})-min(L_{20})<10$, i.e., when a given measured particle stays in the same $L_{10}$ sector, $L_{20}$ is defined and the digital depth z' can be initially estimated for that particle and illumination cycle. This is valid for particles having not extremely high velocities in the depth direction z'.

However, if $max(L_{20})-min(L_{20}) \geq 10$ for a single illumination cycle, it is assumed that the particle has crossed the boundary of a sector in $L_{10}$. Therefore, to establish the depth z' in those cases, it is necessary to look into the last and first few frames levels ($L_{10}$ and $L_{20}$) from the previous and next illumination cycle, respectively. The linkage of temporal information allows the method to define most of the remaining depth positions z' for every particle.

Figure 6:
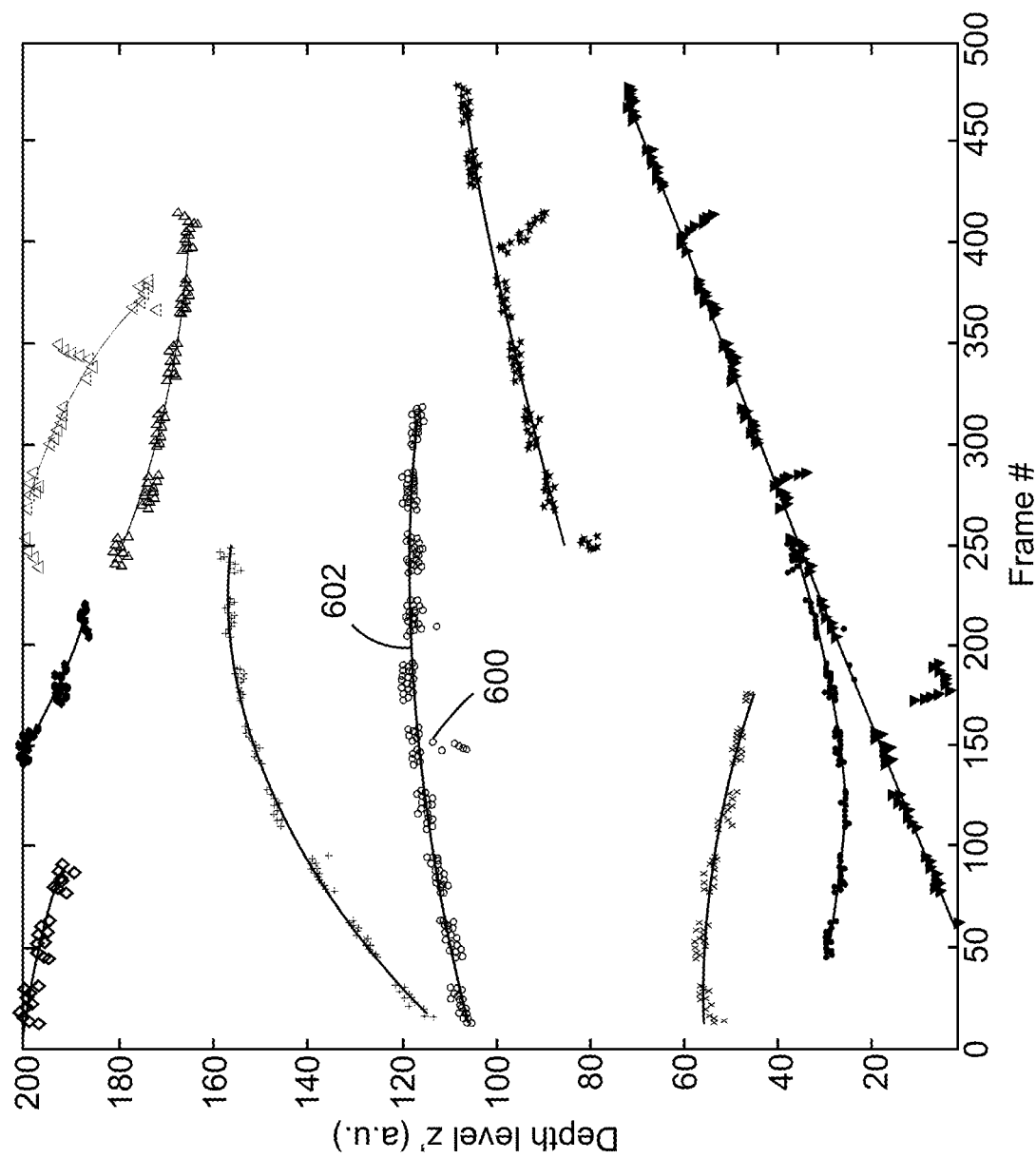
FIG. 6 illustrates a correction in time for the trajectory of moving particles.

Furthermore, the initial estimation of the z' component in the particle trajectories may be refined by a bisquared weighted least-squared fitting giving by z'=f(t). This method assigns smaller weights to the positions in time that are farther from the fit estimations iterations. The quadratic polynomial fit is obtained for every single particle 112. A comparison of a few particles trajectories 600 versus the quadratic polynomial fit 602 is shown in FIG. 6. This figure shows the initially estimated depths z' for various particles over a given number of frames and the solid 602 line of each trajectory represents the polynomial fit of the depth.

Next, the digital space coordinates (x', y', z') of each particle need to be mapped into the real space coordinates (x, y, z). Using the data collected from the 3D position calibration of a known cube, which is associated with FIGS. 4A and 4B, it is observed that the reconstructed cube has distortions due to the divergence of the illumination and lens aberrations. Therefore, it is possible to link the digital coordinates (x', y', z') with the real space using the known coordinates of the particle field of the cube 400. In the following, it is assumed that the real space coordinate z for a particle is given by z=f(x', z'), because the projected light is vertical and the pattern projected does not vary along the vertical axis y. The mapping function "f" is obtained, in one application, by a bisquared weighted polynomial 3-D surface fit of degree 2 in x' and z'. The polynomial model in this embodiment is as follows:

$$z(x',z')=a_0+a_1x'+a_2z'+a_3x'^2+a_4x'z'+a_5z'^2 \quad (3)$$

$$x(x',y',z')=a_0+a_1x'+a_2y'+a_3z'+a_4x'^2+a_5y'^2+a_6z'^2+a_7x'y'+a_8x'z'+a_9y'z' \quad (4)$$

$$y(x',y',z')=a_0+a_1x'+a_2y'+a_3z'+a_4x'^2+a_5y'^2+a_6z'^2+a_7x'y'+a_8x'z'+a_9y'z' \quad (5)$$

where the coefficients $a_0$ to $a_9$ are summarized in Table 1 in FIG. 7. For equations (4) and (5), a 4-D non-linear regression fit is used. Those skilled in the art would understand that other equations may be used for mapping the digital depth space z' to the actual depth z.

After applying the mapping functions calculated with equations (3), (4), and (5) to the known cube, it is found that the error in the 3-D reconstruction of the cube has an $|RMS_e|=0.273$ mm, where the depth component of the error ($e_z$) is the greatest component with $RMS_{ez}=0.271$ mm. This value represents approximately 0.5% of the 50 mm depth from the reconstructed volume, which is considered to be very good.

Figure 8A:
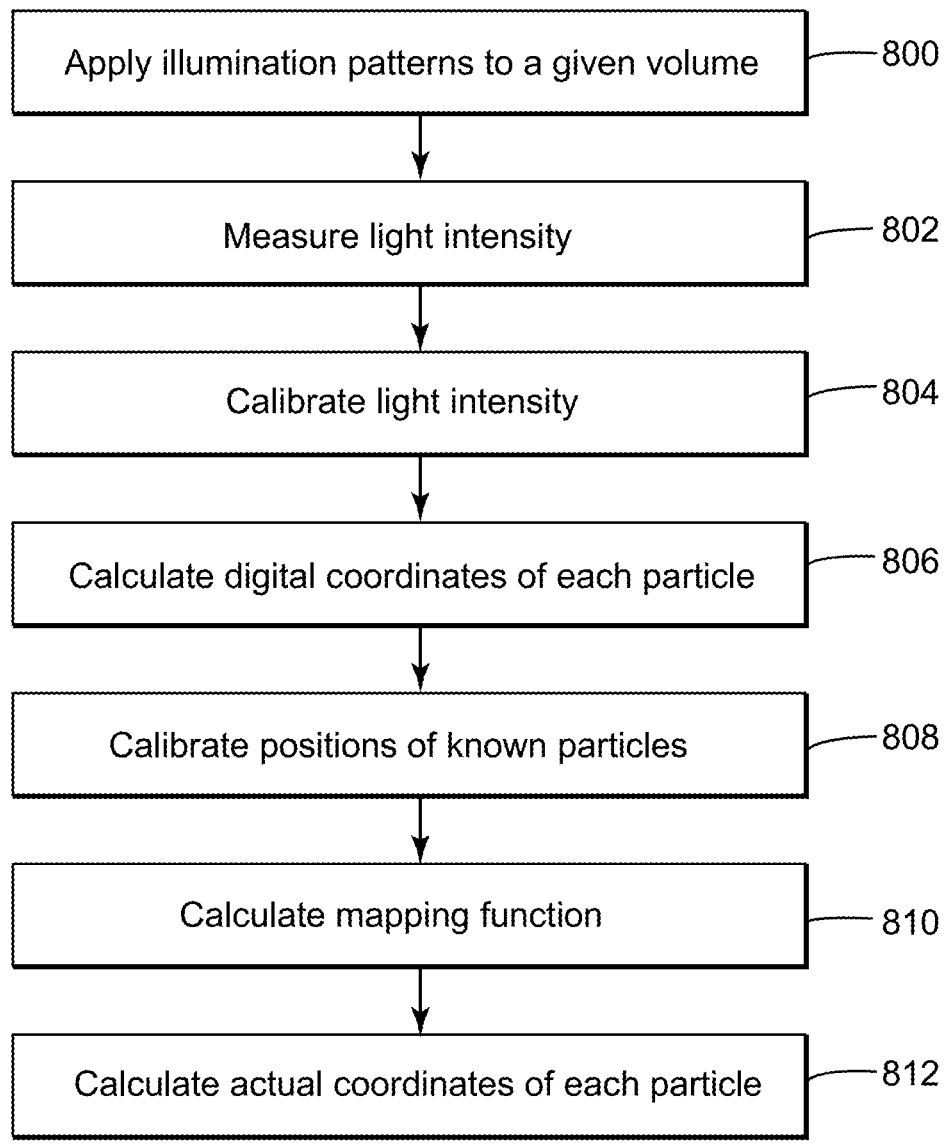
FIG. 8A is a flowchart of a method for calculating the physical coordinates of plural moving particles and FIG. 8B is a more detailed flowchart of the method illustrated in FIG. 8A.

Based on the above discussed steps and processes, a method for reconstructing and tracking one or more particles in 3D inside a fluid, by using a single monochromatic sCMOS camera and a consumer grade projector as a light source is now discussed with regard to FIG. 8A. This new method increases the depth resolution of previous single camera 3D PTV systems (e.g., to 200 levels), increases the reconstructed volume size and minimizes the complexity of the hardware setup. This technique enables industrial, scientific and educational institutions to experimentally study fluid flows for energy, biological, engineering and medical applications.

The method starts with step 800, in which the projector 120 illuminating a selected volume 130 of particles 112. The projector 120 is controlled by controller 140. For example, controller 140 instructs projector 120 to project the patterns 202, 204, 206, and 208 as a sequence 200 onto the particles 112. In one application, 8 frames are used to project these patterns. The sequence 200 may be repeated a number of times so that a trajectory of each particle in the volume 130 is illuminated over time. The projector is configured to send the light patterns along an X direction while the camera is configured to record reflected light coming from the particles 112 along a Z direction, which is perpendicular to the X direction.

In step 802, the light reflected from the particles 112 is recorded by the sensor of the camera 110. The sensor records an intensity of this light. These intensities are sent to the controller 140, which is capable of processing the data. For example, the controller 140 can calculate an average intensity, or a maximum intensity, or a weighted average intensity, or the effective particle intensity defined in equation (2).

In step 804, the intrinsic light intensity of each particle is calibrated. A master light curve is produced as illustrated in FIG. 3. A process, for example, open software Trackmate is used in step 806 for determining the digital coordinates x' and y' of each particle. Note that the digital depth coordinate z' of each particle is related to the recorded intensities and it needs to be extracted. In this step, it is decided which intensity to use for calculating the position of the particle. Based on the selected intensity and the master light curve from step 804, the digital depth coordinate z' is also calculated in this step.

Then, in step 808, 3D known positions of micro-fractures in a static cube are calibrated for determining in step 810 a mapping function f, which maps the digital coordinates (x', y', z') of a particle to the real coordinates (x, y, z) of the same particle. Finally, in step 812, the actual coordinates of each particle is calculated with the mapping function f. As this process is repeated in time, the trajectories of these particles are calculated and then plotted on a monitor for research or other applications.

Figure 8B:
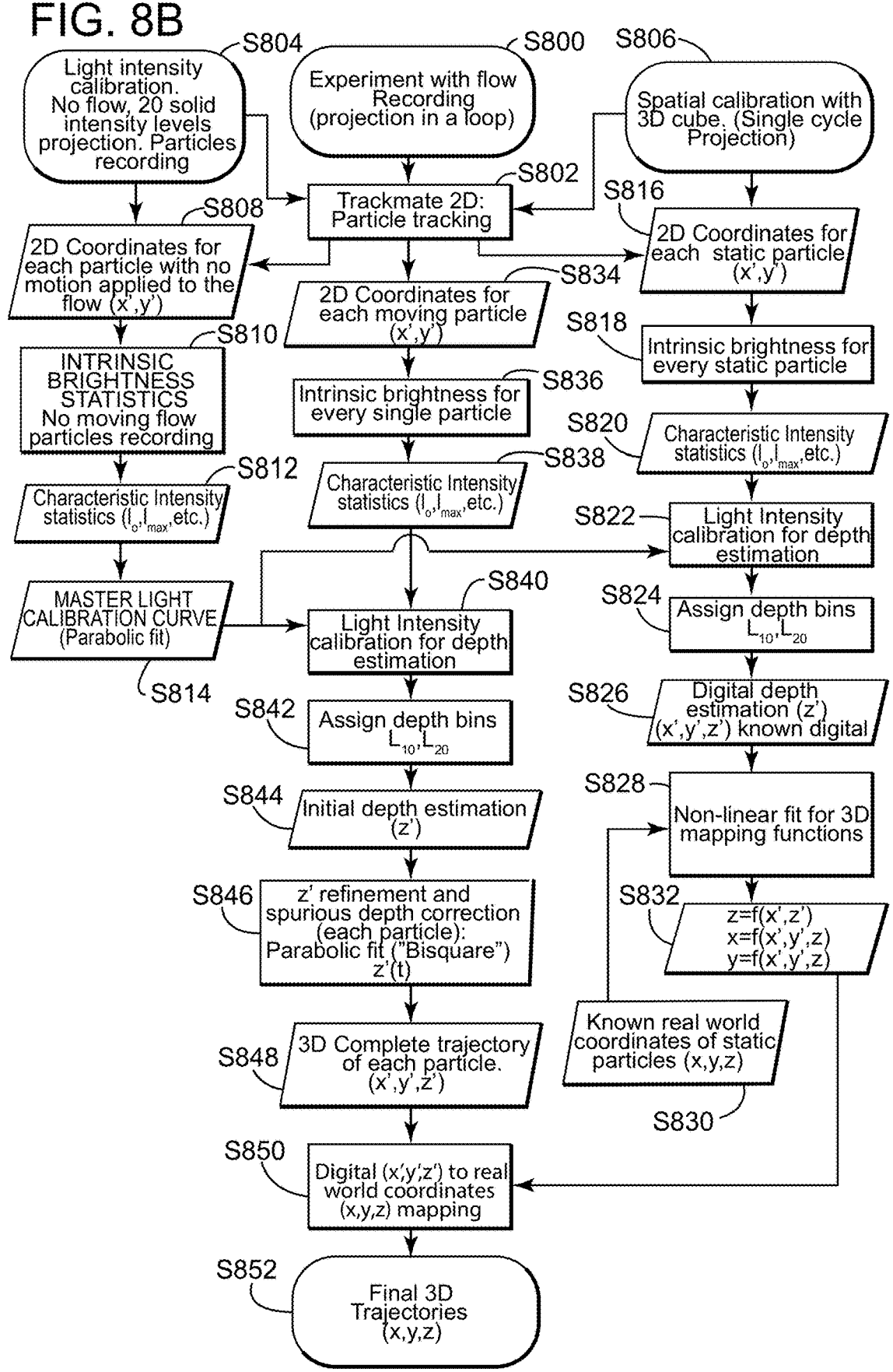

FIG. 8B illustrates in more detail the method for tracking moving particles in a fluid. The method starts in step S800 in which the projector 120 projects light, in a continuous manner, on a selected volume 130 of particles 112. In one application, the projector 120 loops through various patterns of light intensity, for example, as illustrated in FIGS. 2A-2D. In step S802, a software package (e.g., Trackmate 2D) is used to track the particles in a plane. In step S804, a light intensity calibration is performed, similar to that discussed in step 804. This calibration step takes place with no particle flow, for 20 solid intensity level projections. In step S806, a spatial calibration with a 3D cube is performed, as discussed above with regard to FIGS. 4A-4B. Note that this calibration uses a single cycle projection. The information from steps S804 and S806 is provided to the processor that runs the tracking software in step S802.

Based on all this information, the processor may provide in step S808 the 2D coordinates (x', y') for each particle with no motion of the flow, which is used in step S810 to generate the intrinsic brightness statistics. In step S812, the processor calculates the characteristic intensity statistics (as discussed, for example, with regard to equation (2)), and in step S814 the processor calculates the master light calibration curve (see FIG. 3).

Returning to step S802, the processor may calculate in step S816 the 2D coordinates of each static particle and then calculate in step S818 the intrinsic brightness for every static particle. Based on this information, the processor calculates in step S820 the characteristic intensity of each particle (similar to step S812) and calculates in step S822 the light intensity calibration for depth estimation. This step may be calculated based on the output from step S814.

Then, in step S824, depth bins $L_{10}$ and $L_{20}$ are assigned to each measured intensity and in step S826 the digital depth z' is estimated to obtain the x', y', z' digital position of each point. A non-linear fit for 3D mapping functions is applied in step S828 to the digital position of each point, and based on known real world coordinates of the static particles x, y, and z calculated in step S830, the actual physical positions of each particle is calculated in step S832, based, for example, on the functions discussed with regard to equations (3) to (5).

The method may advance from step S802 to a step S834 of calculating the 2D coordinates of each moving particle, a step S836 of calculating the intrinsic brightness for every single particle, a step S838 of calculating the characteristic intensity of each particle, a step S840 of calculating the light intensity calibration for depth estimation (which may use the output from step S814). Then, in step S842, the processor assigns bins $L_{20}$ and $L_{10}$ to each measured intensity, in step S844 the initial depth estimation z' of each particle is calculated, in step S846 the depth estimation z' is refined, in step S848 a 3D complete trajectory of each particle is calculated based on the digital coordinates x', y', z', in step S850 the digital coordinates x', y', z' are transformed to real world coordinates x, y, and z based on input from step S832, and in step S852 the final 3D actual trajectories of the particles are calculated.

To test the method discussed with regard to FIGS. 8A and 8B, the following experiment has been made. A rotational flow was generated in a tank full of heat transfer fluid and the fluid was mixed with a disc attached to a controllable speed motor. The liquid is seeded with white polyethylene particles. The acrylic tank of 120×120×250 mm³ is filled with a mixture of heat transfer fluid 510 and 710. The refractive index of the mix is 1.515 measured at 22° C. This is to match the refractive index of the BK7 calibration cube.

A light intensity calibration is carried out as described with regard to FIG. 3. The motion of the particles is tracked using the Trackmate software. This software provides the 2-D digital coordinates (x', y') with subpixel accuracy. Then, spatial calibration using the crystal cube is carried out as described with regard to FIGS. 4A and 4B.

The disk is rotated at 60 rpm and the 2D trajectories of the particles in time are measured with the configuration shown in FIG. 1 to obtain the intensity profile for every particle in each recorded frame. Then, using the algorithm described with regard to obtaining the digital depth position z', it is possible to obtain the projected depth position z'. The 3-D spurious reconstructions are filtered to the ones that have a z(t) polynomial fit with $R^2>0.9$, as describe with regard to FIG. 6. Subsequently, the mapping function defined in equations (4) to (6) having the coefficients illustrated in FIG. 7 is applied to the digital coordinates (x', y', z') to transform them to the real world coordinates (x, y, z). The results of this experiment show that the single monochromatic camera and the projector having the light intensity patterns discussed with regard to FIGS. 2A to 2D provide a correct and quick estimation image of the trajectories of the studied particles.

Figure 9:
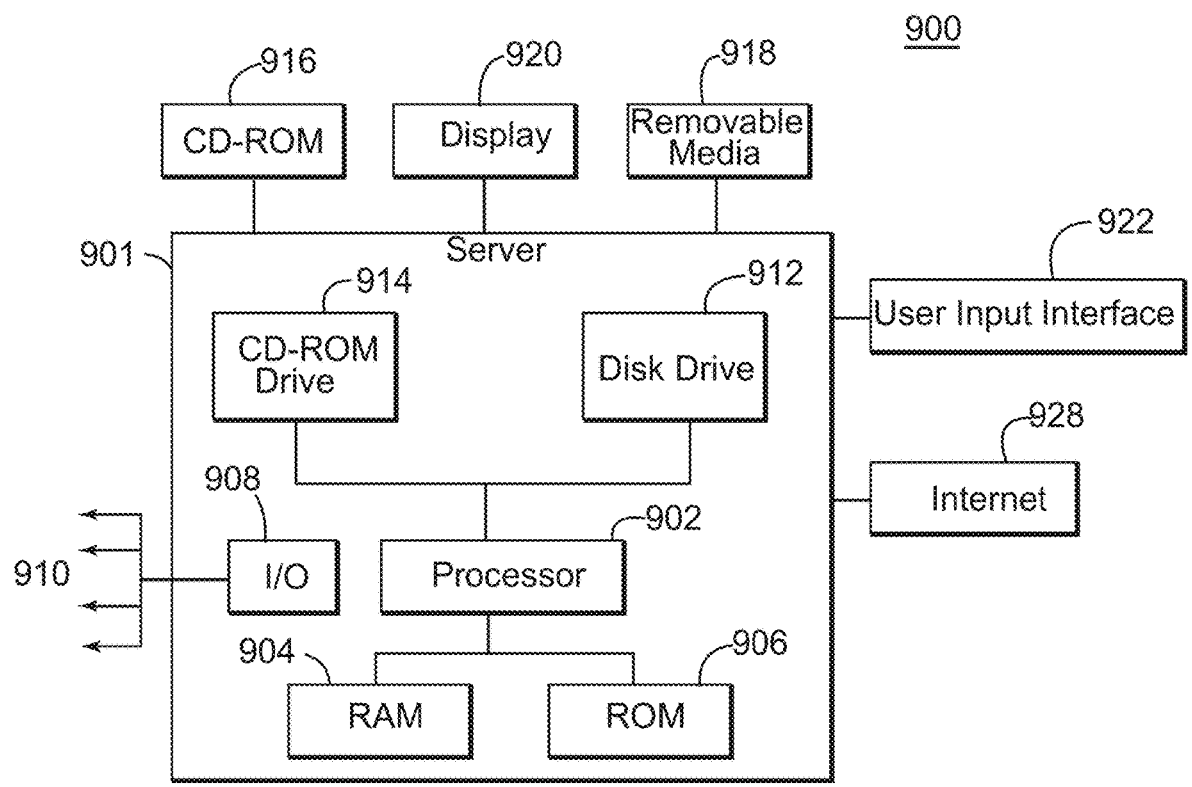
FIG. 9 is a schematic diagram of a controller that calculates the physical coordinates of the plural moving particles.

The above-discussed procedures and methods may be implemented in a computing device or controller as illustrated in FIG. 9. Hardware, firmware, software or a combination thereof may be used to perform the various steps and operations described herein. Computing device 900 of FIG. 9 is an exemplary computing structure that may be used in connection with such a system. In one application, controller 140 from FIG. 1 is the computing device 900.

Exemplary computing device 900 suitable for performing the activities described in the exemplary embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as a smart device, e.g., a phone, tv set, computer, etc. The server may be part of a larger network configuration as in a global area network (GAN) such as the Internet 928, which allows ultimate connection to various landline and/or mobile computing devices.

The disclosed embodiments provide methods and mechanisms for tracking particles in a fluid medium with a single camera. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for tracking moving particles in a fluid, the method comprising:
   illuminating the moving particles with an illumination sequence of patterns generated by a light projector;
   measuring with a single camera light intensities reflected by the moving particles;
   calculating, based on the measured light intensity, digital coordinates (x', y', z') of the moving particles, wherein a digital depth z' corresponds to an intensity count measured by a sensor of the single camera;
   determining a mapping function f that maps the digital coordinates (x', y', z') of the moving particles to physical coordinates (x, y, z) of the moving particles; and
   calculating the physical coordinates (x, y, z) of the moving particles based on the mapping function f and the digital coordinates (x', y', z') for generating paths of the moving particles,
   wherein the illumination sequence of patterns is generated with a single wavelength, and
   wherein light emitted by the projector is perpendicular to light received by the single camera.

2. The method of claim 1, wherein the illumination sequence of patterns includes at least three distinct patterns.

3. The method of claim 1, wherein the illumination sequence includes a first pattern that has a constant intensity, a second pattern that has a step-like intensity and a third pattern that has a gradient intensity.

4. The method of claim 3, wherein the second pattern includes 10 different intensities.

5. The method of claim 4, wherein the third pattern includes 20 different intensities.

6. The method of claim 3, wherein the illumination sequence includes a fourth pattern that is a mirror image of the second pattern.

7. The method of claim 1, further comprising:
   generating a master light curve for the particles by calibrating static particles in a given volume.

8. The method of claim 7, further comprising:
   selecting a pixel intensity $I_o$ for estimating the digital depth coordinate z' of the particles, wherein the pixel intensity $I_o$ is a combination of a central intensity and an image width.

9. The method of claim 8, further comprising:
   extracting the digital depth coordinate z' of each particle from the master light curve using the pixel intensity $I_o$.

10. The method of claim 9, further comprising:
    extracting the x' and y' digital coordinates of each particles from images collected by the camera.

11. The method of claim 10, further comprising:
    using a known volume with static marks to calibrate three-dimensional positions of the marks.

12. The method of claim 11, further comprising:
    using the digital coordinates (x', y', z') and results of the calibration of the three-dimensional positions of the marks to determine plural coefficients as of the mapping function f.

13. The method of claim 12, wherein the mapping function f is a bisquared weighted polynomial three-dimensional surface fit of degree 2 in coordinates x' and z'.

14. A particle tracking velocimetry (PTV) system comprising:
    a transparent tank configured to hold plural particles that move in a fluid;
    a light projector that is configured to generate a monochromatic light and illuminate with the monochromatic light the plural particles while moving;
    a single camera configured to record light intensities associated with light reflected on the moving plural particles; and
    a controller connected to the light projector and to the single camera and configured to calculate paths of the moving particles based on the light intensities recorded by the single camera, wherein the controller is configured to,
      calculate digital coordinates (x', y', z') of the moving particles, where a digital depth z' corresponds to an intensity count measured by a sensor of the single camera,
      determine a mapping function f that maps the digital coordinates (x', y', z') of the moving particles to physical coordinates (x, y, z) of the moving particles, and
      calculate the physical coordinates (x, y, z) of the moving particles based on the mapping function f and the digital coordinates (x', y', z') for generating the paths of the moving particles,
    wherein the monochromatic light projected by the projector is perpendicular on the light recorded by the single camera.

15. The system of claim 14, wherein the light projector illuminates the moving particles with an illumination sequence of patterns.

16. The system of claim 15, wherein the illumination sequence includes a first pattern that has a constant intensity, a second pattern that has a step-like intensity and a third pattern that has a gradient intensity.

17. The system of claim 16, wherein the second pattern includes 10 different intensities and the third pattern includes 20 different intensities.

18. The system of claim 14, wherein the controller generates a master light curve for the particles by calibrating static particles in a given volume, extracts the digital depth coordinate z' of each particle from the master light curve using a recorded maximum pixel intensity $I_{max}$, and extracts the x' and y' digital coordinates of each particle from images collected by the camera.

19. The system of claim 18, wherein the controller calibrates three-dimensional positions of marks using a known volume with static marks and uses the digital coordinates (x', y', z') and results of the calibration of the three-dimensional positions of the marks, and determines plural coefficients as of the mapping function f.

\* \* \* \* \*